H. C. BRUSH.
TROLLING-HOOKS FOR FISHING.
No. 181,308.  Patented Aug. 22, 1876.
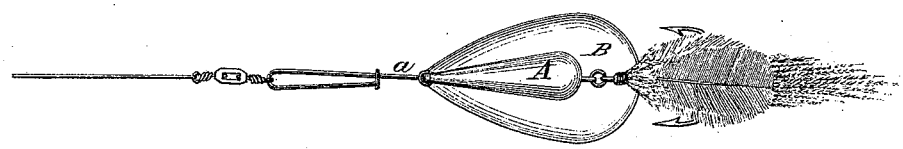
WITNESSES:
H. Rydquist.
John Goethals
INVENTOR:
H. C. Brush
BY    Munn
ATTORNEYS.

UNITED STATES PATENT OFFICE.

HENRY C. BRUSH, OF BRUSH'S MILLS, NEW YORK.

IMPROVEMENT IN TROLLING-HOOKS FOR FISHING.

Specification forming part of Letters Patent No. 181,308, dated August 22, 1876; application filed July 22, 1876.

*To all whom it may concern:*

Be it known that I, HENRY CORBIN BRUSH, of Brush's Mills, Franklin county, New York, have invented a new and Improved Troller, of which the following is a specification:

My invention consists in attaching a float to the shank of the troller under the revolving blade, the object being to keep the troller near the surface of the water, where the fish may see it more readily, and whereby the liability of catching in weeds and logs is obviated.

Referring to the drawing, A is a float, made from wood, cork, thin metal, or any suitable material, and placed on or attached to the shank *a* of the troller. B is the spoon or blade of the troller, which is swiveled to the shank *a* in the usual manner.

The great drawback in fishing with a troller as ordinarily constructed is that the hooks are constantly catching in logs and weeds, breaking the hooks or line. With my improvement this difficulty is entirely obviated, as the float causes the troller to run near the surface of the water.

Having thus described my invention, I claim as new and desire to secure by Letters Patent—

The combination of the float A with the shank *a*, spoon B, and hooks of an ordinary troller, substantially as shown and described.

HENRY CORBIN BRUSH.

Witnesses:
ELMER A. CHAFFEE,
B. F. HARRIS.